United States Patent
Zuo et al.

(10) Patent No.: US 7,511,917 B2
(45) Date of Patent: Mar. 31, 2009

(54) DISC DRIVE WINDAGE MANAGEMENT ARRANGEMENT WITH UPSTREAM FLUID FLOW STRIPPER AND DOWNSTREAM DISC EDGE DAMPER

(75) Inventors: Xu Zuo, Prior Lake, MN (US); Xiaohong Sun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 407 days.

(21) Appl. No.: 10/914,521

(22) Filed: Aug. 9, 2004

(65) Prior Publication Data

US 2006/0028761 A1 Feb. 9, 2006

(51) Int. Cl.
*G11B 33/14* (2006.01)
*G11B 25/04* (2006.01)

(52) U.S. Cl. .................................. 360/97.02; 360/97.03
(58) Field of Classification Search .............. 360/97.01, 360/97.02, 97.03, 98.01
See application file for complete search history.

(56) References Cited

U.S. PATENT DOCUMENTS

| | | | |
|---|---|---|---|
| 4,821,130 A | | 4/1989 | Bernett et al. |
| 5,134,530 A | * | 7/1992 | Hall ........................ 360/97.03 |
| 5,898,545 A | | 4/1999 | Schirle |
| 6,031,690 A | * | 2/2000 | Kelemen et al. ......... 360/256.1 |
| 6,091,570 A | * | 7/2000 | Hendriks ................. 360/97.03 |
| 6,449,119 B1 | | 9/2002 | Hashizume et al. |
| 6,462,901 B1 | | 10/2002 | Tadepalli |
| 6,487,038 B1 | * | 11/2002 | Izumi et al. .............. 360/97.02 |
| 6,496,327 B2 | | 12/2002 | Xia et al. |
| 6,560,065 B1 | * | 5/2003 | Yang et al. ................ 360/97.02 |
| 6,624,966 B1 | * | 9/2003 | Ou-Yang et al. ......... 360/97.02 |
| 6,788,493 B1 | * | 9/2004 | Subramaniam et al. .. 360/97.02 |
| 7,006,324 B1 | * | 2/2006 | Oveyssi et al. ........... 360/97.02 |
| 7,203,030 B2 | * | 4/2007 | Chan et al. ............... 360/97.02 |
| 2002/0008934 A1 | * | 1/2002 | Tadepalli et al. ......... 360/97.02 |
| 2002/0015255 A1 | | 2/2002 | Tadepalli et al. |
| 2002/0036862 A1 | | 3/2002 | Tsang et al. |
| 2002/0063991 A1 | * | 5/2002 | Machcha et al. ......... 360/97.03 |
| 2002/0097525 A1 | * | 7/2002 | Rao et al. ................. 360/97.02 |
| 2002/0149876 A1 | * | 10/2002 | Sakata et al. ............. 360/97.02 |
| 2002/0181138 A1 | | 12/2002 | Toffle et al. |
| 2002/0181148 A1 | | 12/2002 | Dahlenburg et al. |
| 2002/0195581 A1 | | 12/2002 | McCarty et al. |
| 2003/0210492 A1 | * | 11/2003 | Adams et al. ............ 360/97.02 |
| 2004/0184180 A1 | * | 9/2004 | Tadepalli et al. .............. 360/75 |
| 2004/0252405 A1 | * | 12/2004 | Sun et al. ................. 360/97.02 |

* cited by examiner

*Primary Examiner*—Craig A Renner
(74) *Attorney, Agent, or Firm*—Fellers, Snider, et al.

(57) ABSTRACT

A windage management arrangement for attenuating fluid flow disturbances on an actuator and a moving disc, comprising in combination a fluid flow stripper upstream of the actuator and a disc edge damper downstream of the actuator. A method for managing fluid flow created by a rotating disc that is operably disposed adjacent to an actuator, comprising diverting an upstream portion of the fluid flow, with respect to the actuator, away from the actuator; and diverting a downstream portion of the fluid flow, with respect to the actuator, away from a disc edge.

7 Claims, 10 Drawing Sheets

FIG_4

DISC DRIVE WINDAGE MANAGEMENT ARRANGEMENT WITH UPSTREAM FLUID FLOW STRIPPER AND DOWNSTREAM DISC EDGE DAMPER

FIELD OF THE INVENTION

The embodiments of the present invention relate generally to the field of data writing systems and more particularly without limitation to windage management for reducing fluid flow excitation of data writing components.

BACKGROUND

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance from the data storage surface by a fluid bearing generated by fluid currents caused by the spinning discs. The term "fluid bearing" is synonymous with the term "air bearing" where the fluid utilized in the disc drive is air. Alternatively, the term "fluid bearing" is applicable to other embodiments utilizing a fluid other than air, such as helium.

Another continuing trend in the data storage industry is toward ever-increasing the data storage capacity and the processing speed while maintaining or reducing the physical size of the disc drive. Consequently, the data transfer member and the supporting structures are continually being miniaturized, and data storage densities are continually being increased. One result is an overall increased sensitivity to vibration as a percentage of track width.

One source of vibration comes from the fluid currents, or windage, that is created by the spinning discs. Fluid flow perturbations, and especially turbulent fluid flow, can excite the actuator and/or the disc creating vibrations. During servo track writing operations, for example, such vibrations can create actuator positional control errors resulting in irregular servo track formatting such as but not limited to track squeeze.

While various proposed solutions have been found operable, there remains a continued need for improvements in windage management for attenuating excitation energy. It is to such improvements that the claimed invention is generally directed.

SUMMARY OF THE INVENTION

In accordance with preferred embodiments, an apparatus and method are provided for managing windage in a data writing device for attenuating excitation energy.

In some embodiments a windage management arrangement is provided for attenuating fluid flow disturbances on an actuator and a moving disc, comprising in combination a fluid flow stripper upstream of the actuator and a disc edge damper downstream of the actuator.

In other embodiments a method is provided for managing fluid flow created by a rotating disc that is operably disposed adjacent to an actuator, comprising diverting an upstream portion of the fluid flow, with respect to the actuator, away from the actuator; and diverting a downstream portion of the fluid flow, with respect to the actuator, away from a disc edge.

In yet other embodiments a data writing device is provided comprising a rotatable data storage disc and an actuator in a writing relationship with the disc, the disc and actuator being shielded to minimize data transfer errors by steps for managing the fluid flow produced by the disc rotation.

DETAILED DESCRIPTION

Figure 1:
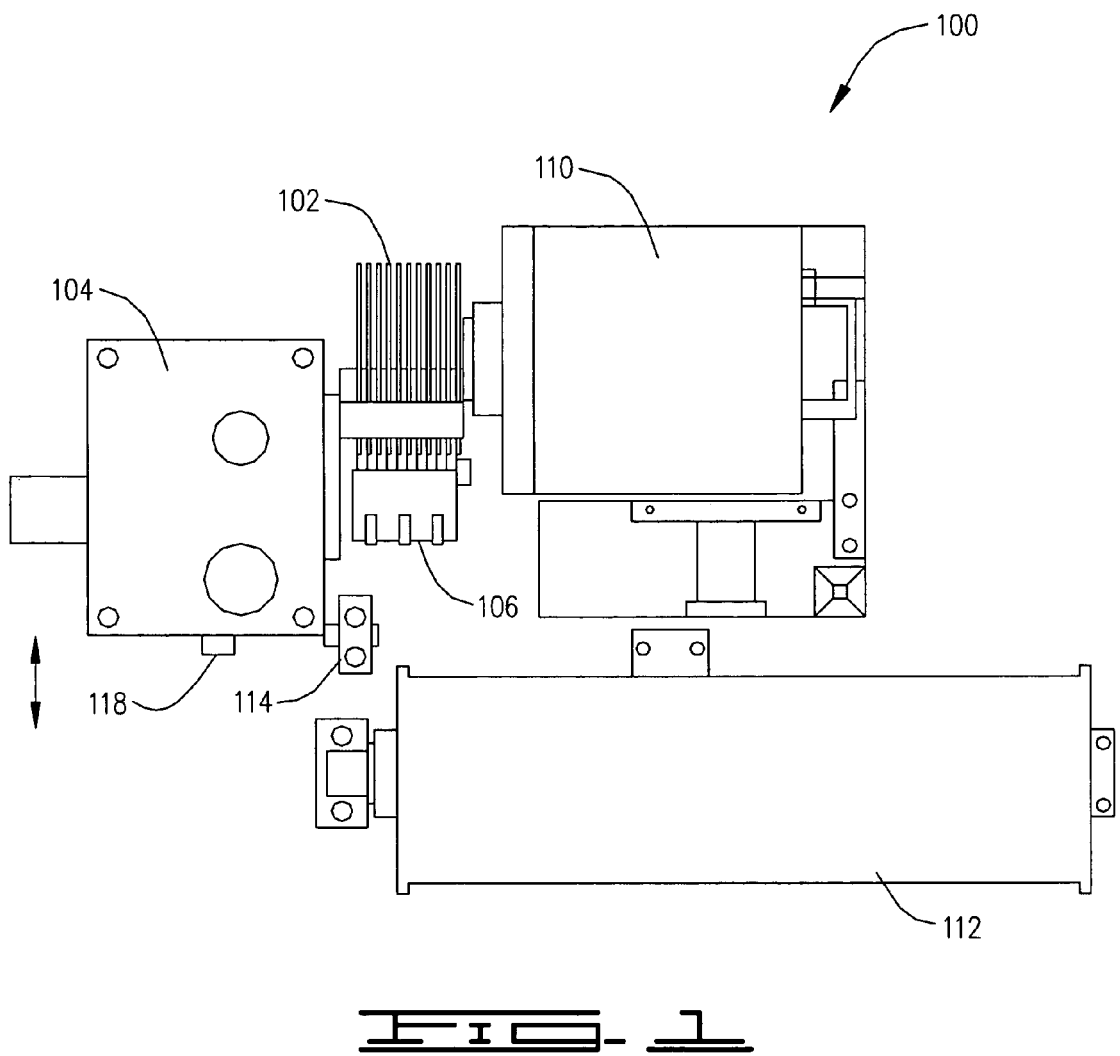
FIG. 1 is a plan view of an ex-situ servo track writer constructed in accordance with embodiments of the present invention.
Figure 2:
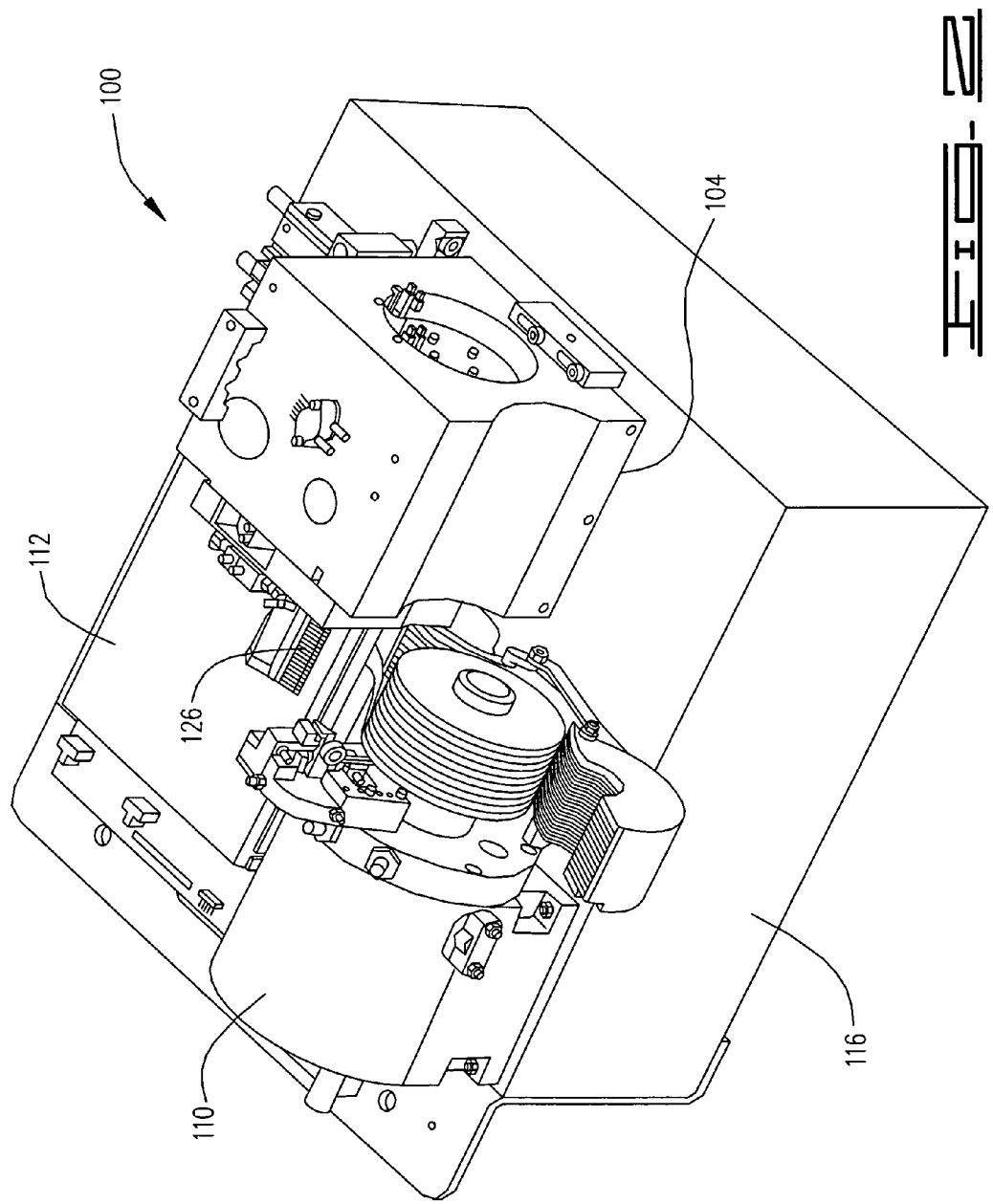
FIG. 2 is an isometric view of the servo track writer of FIG. 1.
Figure 3:
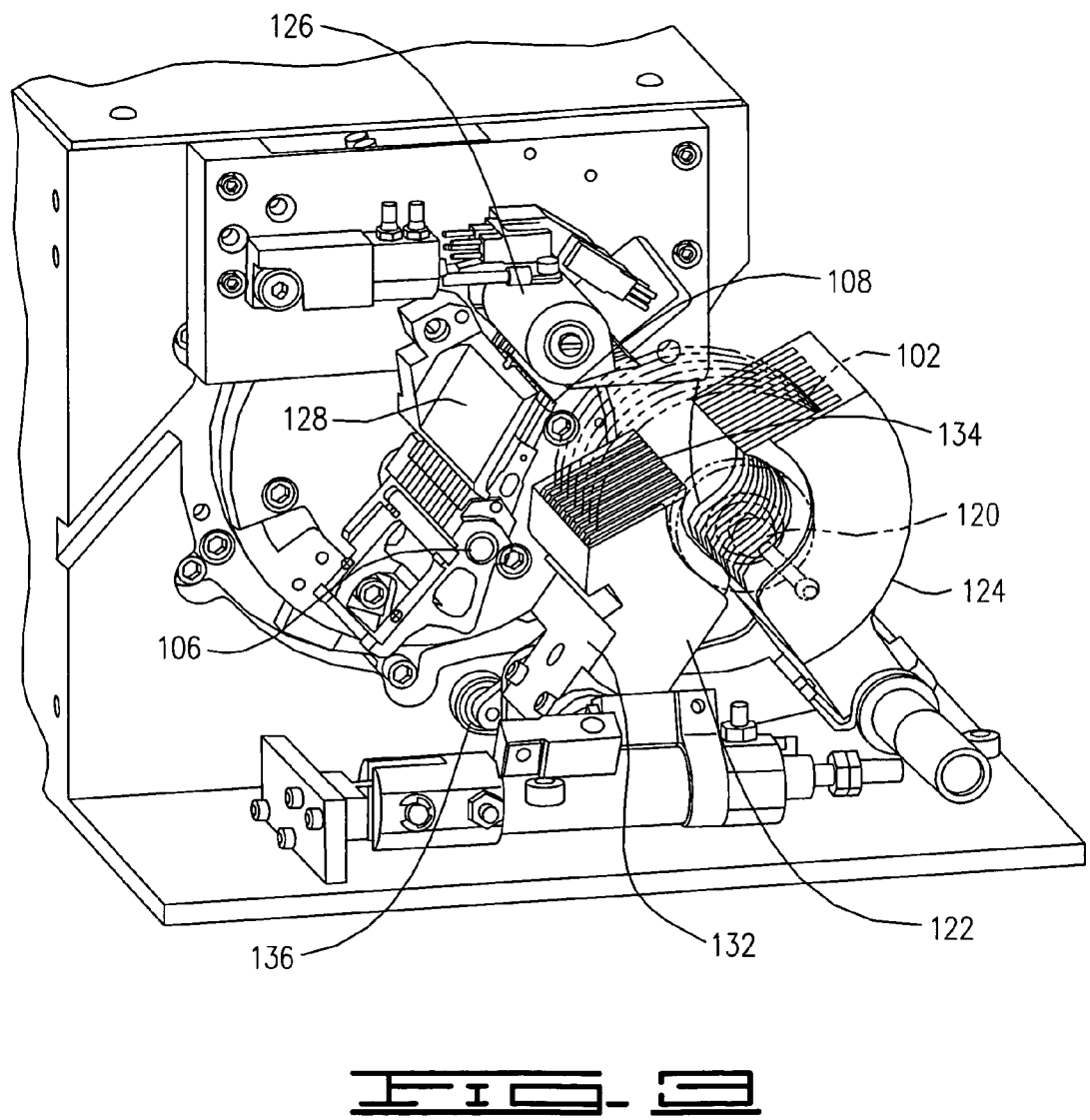
FIG. 3 is an enlarged detail of a portion of FIG. 2.

Turning now to FIGS. 1-3, embodiments of the present invention are addressed with regard to an ex-situ servo track writing device 100 that is used to write servo data information to a multi-disc stack of discs 102. The device 100 includes an actuator assembly 104 for positioning an actuator 106 supporting servo recording heads 108 at a distal end thereof for recording the servo information. A motor hub assembly 110 rotationally presents the discs 102 to the recording heads 108. A vacuum chuck 112 secures the actuator assembly 104 between a servo writing position, shown in FIG. 3, and a retracted position where the multi-disc stacks are loaded and unloaded, shown in FIG. 2. A laser interferometer 114 provides position control for the angular displacement of the servo recording heads 108. A base 116, such as a granite slab, supports the device 100 components. A linear slide 118 defines a constrained lateral movement for the actuator assembly 104 between the servo writing and the load/unload positions. With the actuator assembly 104 in the load/unload position (FIG. 2) a spindle hub 120 supporting the plurality of discs 102 is loaded to the motor 110. A fluid flow stripper 122 and a fluid flow dam 124 are then articulated to partially enclose the plurality of discs 102. The actuator assembly 104 is then moved laterally by the slide 118 into operable engagement with the multi-disc stack. A comb 126 pivots to clearingly engage the plurality of servo recording heads 108 with the respective discs 102 so that the actuator 106 can be loaded to the multi-disc stack. With the actuator 106 loaded, the motor 110 spins the multi-disc stack and servo track writing begins.

Each of the discs 102 has a data storage region comprising a data recording surface on which the head 108 writes servo information defining the data track locations. The servo information is thus prewritten to the discs 102 before being installed into a data storage device; this is referred to as "ex-situ" servo track writing. The data tracks can be defined in various arrangements, such as being concentric or spiraled. Accordingly, the device 100 is sometimes referred to as a data writing device.

The motor 110 spins the discs 102 at a high speed while each head 108 writes to the data storage surface. The kinetic energy of the spinning discs 102 is transferred by friction to the fluid at the disc/fluid boundary layer, thereby imparting a force vector to the fluid. The combined rotational and centrifugal forces from the spinning discs 102 creates a generally outwardly spiraling fluid flow pattern to the fluid surrounding the discs 102. This fluid flow, or windage, can be attenuated to reduce excitation energy on the actuator 106 and the disc 102 below acceptable thresholds by practicing embodiments of the present invention.

A windage management arrangement in accordance with embodiments of the present invention comprises in combination the fluid flow stripper 122 and a disc edge damper 128. In the illustrative embodiments of FIG. 4, the direction of disc 102 rotation is indicated by reference number 130. The fluid flow stripper 122 is disposed upstream of the actuator 106, with respect to the direction of disc 102 rotation; the disc edge damper 128 is disposed downstream of the actuator 106.

The stripper 122 has a body portion 132 and a plurality of spatially disposed plates 134 defining gaps therebetween that are receivingly engageable with the discs 102. The body portion 132 can be journalled by pivots 136 for articulating movement between the retracted position (FIG. 2) and the engaged position (FIG. 3). In the retracted position the plates 134 are clearingly disengaged from the disc 102 permitting movement of the disc 102 along the axis of disc 102 rotation for loading and unloading the multi-disc stack to the device 100.

The windage management arrangement acts upstream of the actuator 106 in that the body 132 defines a passageway 137 through which the plates 134 strip away and divert a portion 138 of the windage created by the spinning discs 102. The windage management arrangement furthermore acts downstream of the actuator 106 in that the damper 128 has a baffle 140 disposed in a close-mating edgewise relationship with the disc 102.

Figure 4:
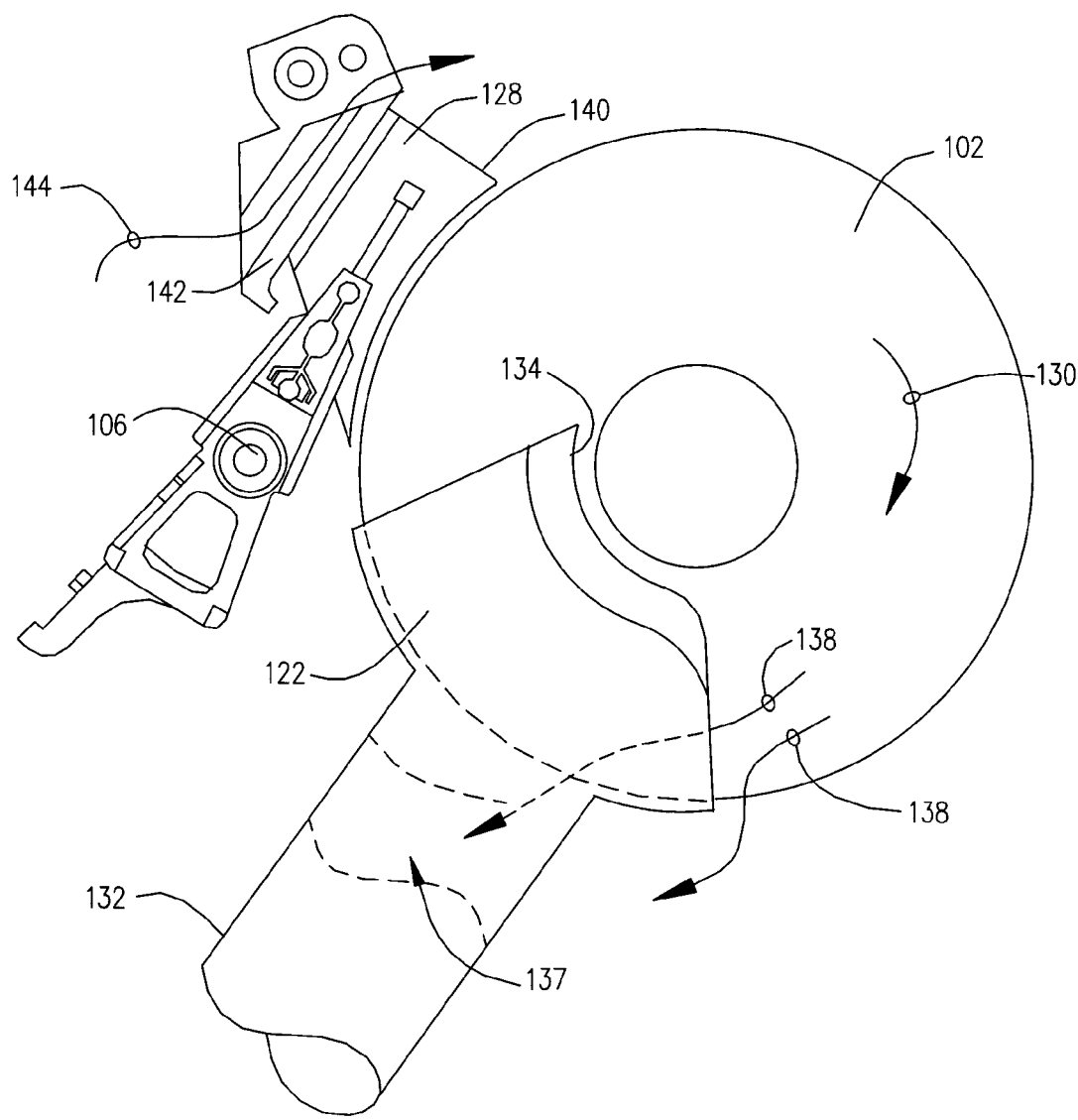
FIG. 4 is a plan view of the fluid flow stripper and disc edge damper of the servo track writer of FIG. 1.

The outwardly spiraling fluid flow creates a zone of low pressure at the disc 102 center. Accordingly, typically there will be set up a return fluid flow from beyond the disc 102 edge and toward the disc 102 center. To minimize disturbances acting on the actuator 106, it is advantageous to prevent this return fluid flow from flowing over the actuator 106. The damper 128 defines a shroud portion 142 spanning the baffles 140 and blocking fluid from flowing across the baffles 140 in a direction toward the disc 102. This is illustrated in FIG. 4 by return fluid flow 144 that is diverted by the shroud 142 away from the actuator 106.

Figure 5:
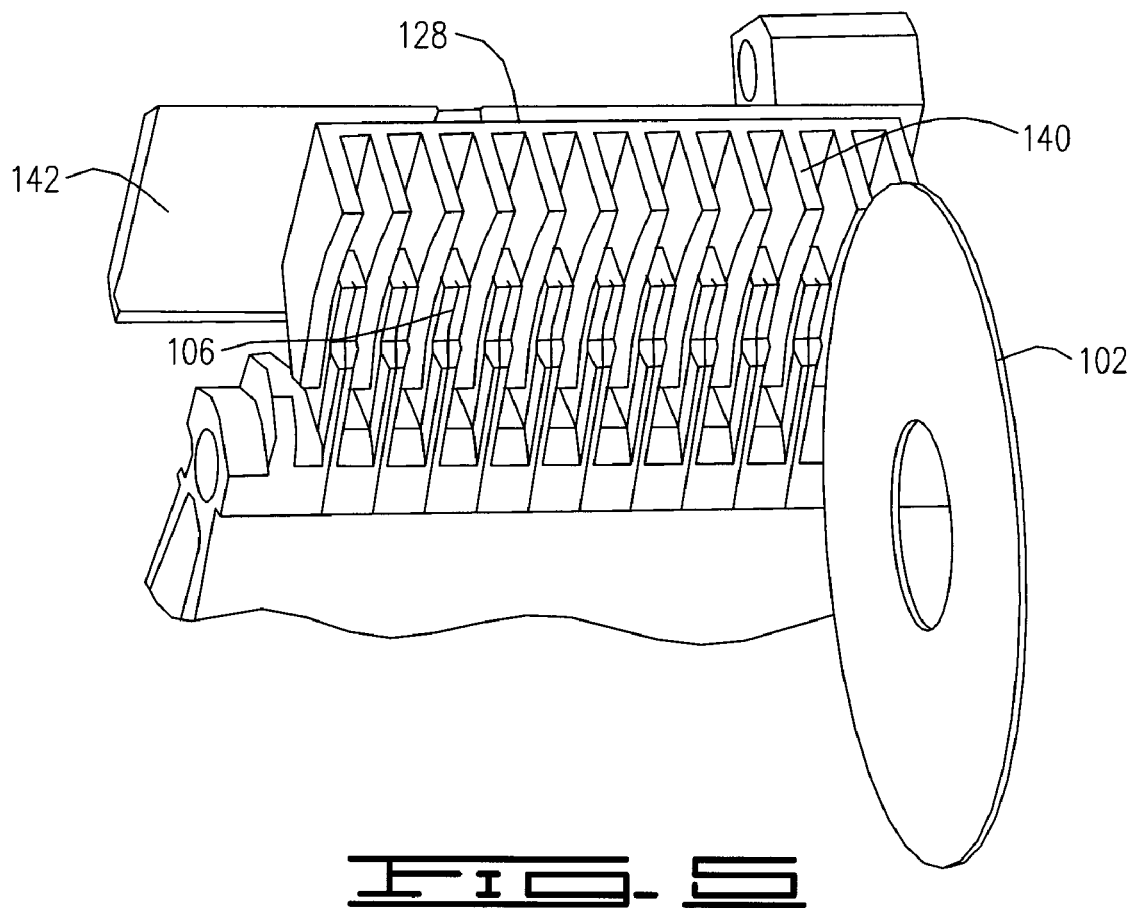
FIG. 5 is an isometric view of the disc edge damper of the servo track writer of FIG. 1.

FIG. 5 is an isometric view of the damper 128 with twelve baffles 140 for use with a multi-disc stack of twelve discs 102 (just one disc 102 is shown for clarity).

Figure 6:
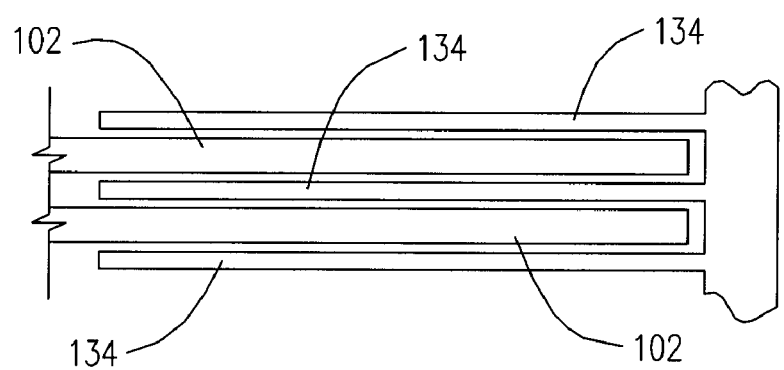
FIG. 6 is an elevational view of a portion of the fluid flow stripper.

FIG. 6 is an elevational view of the discs 102 and a portion of the stripper 122 best showing the gaps between adjacent plates 134 are sized to provide a close mating relationship between the plates 134 and opposing sides of the discs 102. The flow restriction resulting from the close mating relationship strips away, or diverts, a portion of the fluid flowing from the generally spiraling flow that would otherwise engage the actuator 106.

Figure 7:
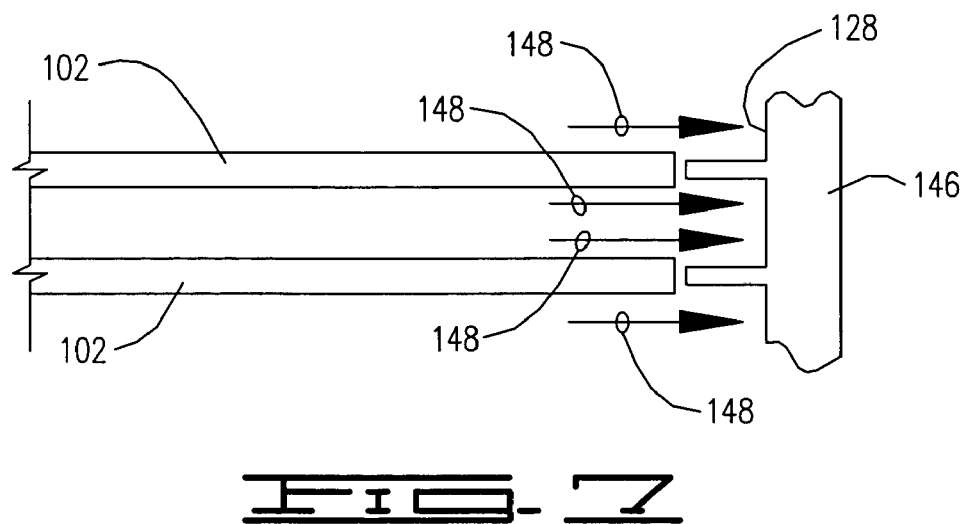
FIG. 7 is an elevational view of a portion of the disc edge damper.

Turning now to FIG. 7 which is an elevational view of a portion of the damper 128 that has a pair of baffles 140 extending from a body portion 146 and disposed in a close-mating edgewise relationship with the discs 102. A relatively small clearance between the baffle 140 and the respective disc 102 acts to divert the generally spiraling fluid flow away from the disc 102 edge as indicated by fluid flows represented by reference number 148. In some embodiments this clearance has been provided at about 0.010 inches, and in other embodiments the clearance has been reduced to about 0.007 inches. In any event, the small clearance prevents shedding vortices from being formed by the outwardly spiraling fluid flow passing past the disc 102 edge.

Figure 8:
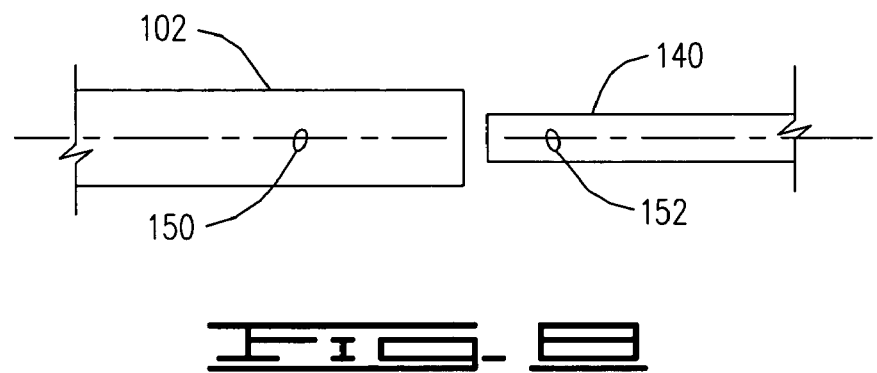
FIG. 8 is an enlarged detail of a portion of FIG. 7.

FIG. 8 is an enlarged detail view of the disc 102 and the baffle 140 of FIG. 7. The disc 102 defines a central plane 150 and the baffle 140 defines a central plane 152. Preferably, these two central planes 150, 152 are disposed so as to be coplanar. To minimize the formation of turbulent flow, preferably the baffle 140 is about the same size or slightly smaller than the disc 102 thickness. In some embodiments it has been determined that in order to obtain sufficient structural integrity the baffle 140 can be formed with a cross sectional thickness that is greater than one-half the disc 102 thickness.

Figure 9:
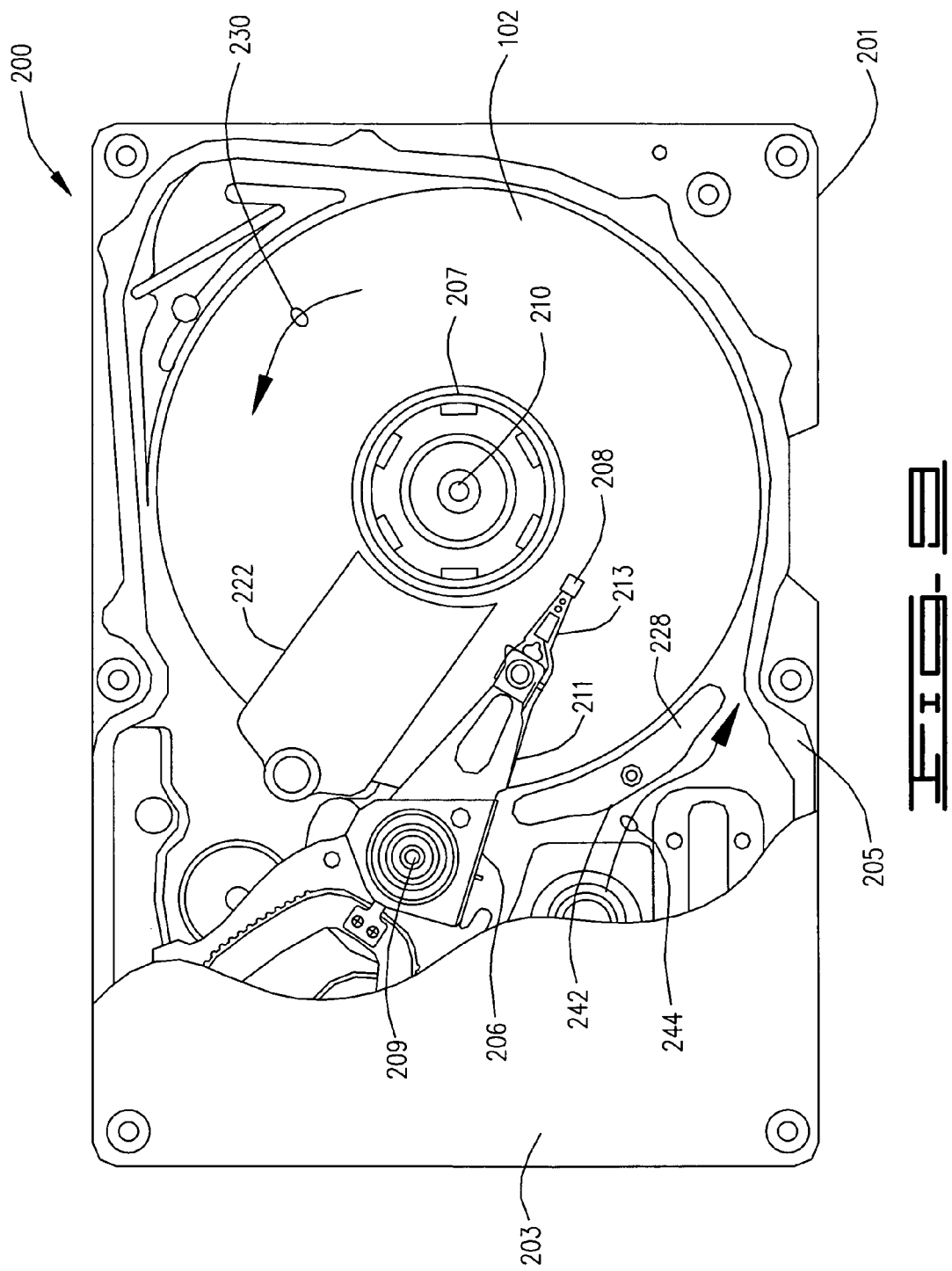
FIG. 9 is a plan view of a data storage device constructed in accordance with embodiments of the present invention.

Turning now to FIG. 9, shown therein is a plan view of a data storage device 200 that is constructed in accordance with embodiments of the present invention. The data storage device 200 includes a base 201 to which various disc drive components are mounted, and a cover 203 (partially cutaway) which together with the base 201 and a perimeter gasket 205 form an enclosure providing a sealed internal environment for the data storage device 200.

Mounted to the base 201 is a motor 210 to which one or more discs 102 are stacked and secured by a clamp ring 207 for rotation in direction 230. Where a plurality of discs 102 are stacked to form a disc stack, adjacent discs 102 are typically separated by a disc spacer (not shown). An actuator 206 pivots around a pivot bearing 209 in a plane parallel to the discs 102. The actuator 206 has actuator arms 211 (only one shown in FIG. 9) that support load arms 213 in travel across the discs 102. The load arms 213 are flex members that support data transfer members, such as read/write heads 208, with each of the heads 208 operationally interfacing a surface of one of the discs 102 in a data reading and writing relationship. This relationship is maintained by a slider (not shown) which operably supports the head 208 on a fluid bearing sustained by fluid currents generated by the spinning discs 102. In some embodiments the fluid can be air; in other embodiments the fluid can be something other than air such as but not limited to helium.

Figure 10:
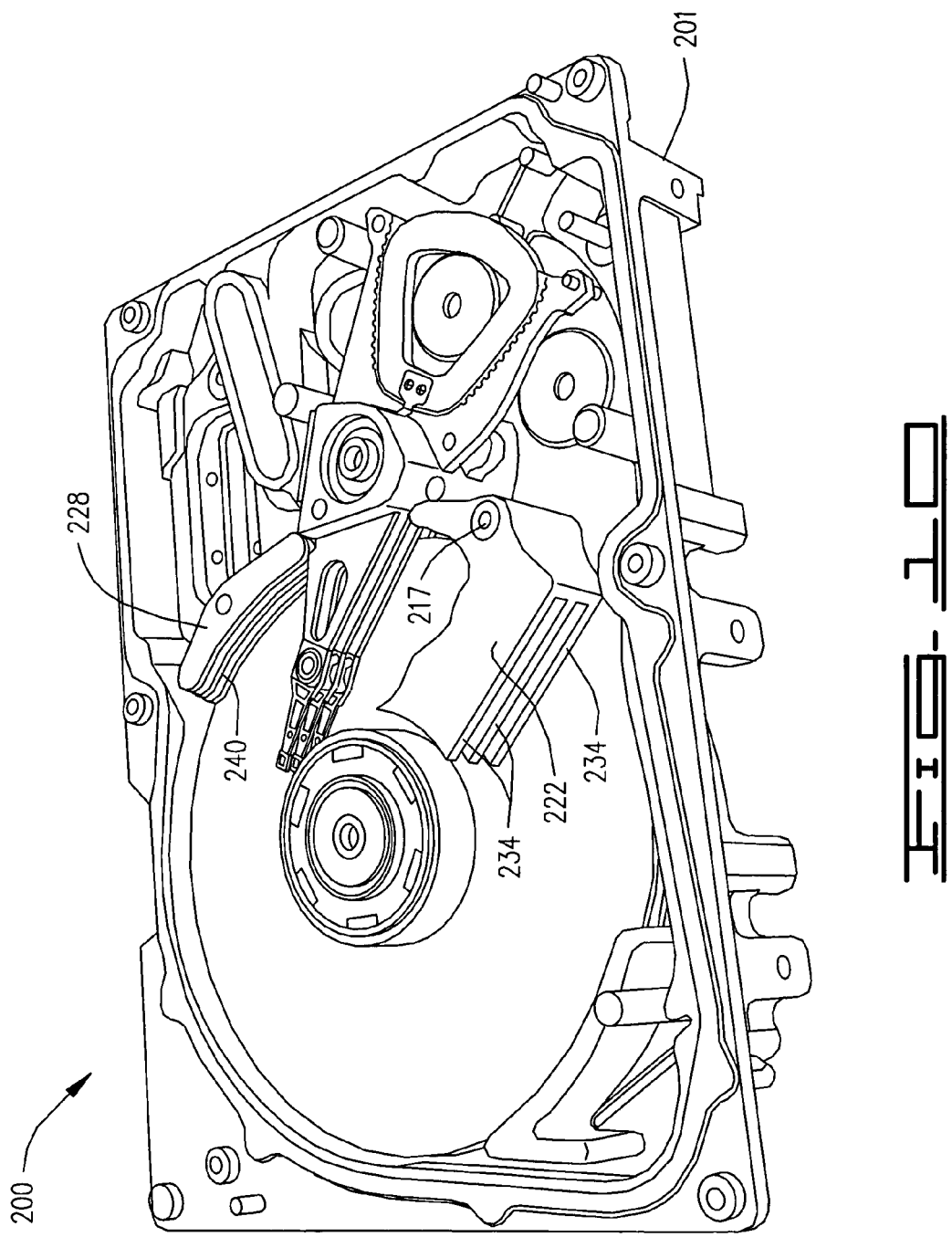
FIG. 10 is an isometric view of the data storage device of FIG. 9 with the discs removed for clarity.

FIG. 10 is an isometric view of the data storage device 200 with the discs 102 removed for better viewing of a stripper 222 and a damper 228, similar to that discussed above. The stripper 222 has a body portion and a number of plates 234 extending from the body. The body portion can be readily adapted for fastening to the base 201 such as by a fastener 217. The plates 234 are spatially separated defining gaps therebetween for receivingly engaging one of the discs 102 in the disc stack. For example, the embodiments of FIG. 10 illustrate a stripper 222 defining two gaps for use with a two-disc 102 stack. In alternative embodiments, the illustrative stripper 222 of FIG. 10 can be used with three-disc and four-disc stacks where one of the plates 234 cooperates with either the base 201 or the cover 203 in enclosing the respective disc 102.

Figure 11:
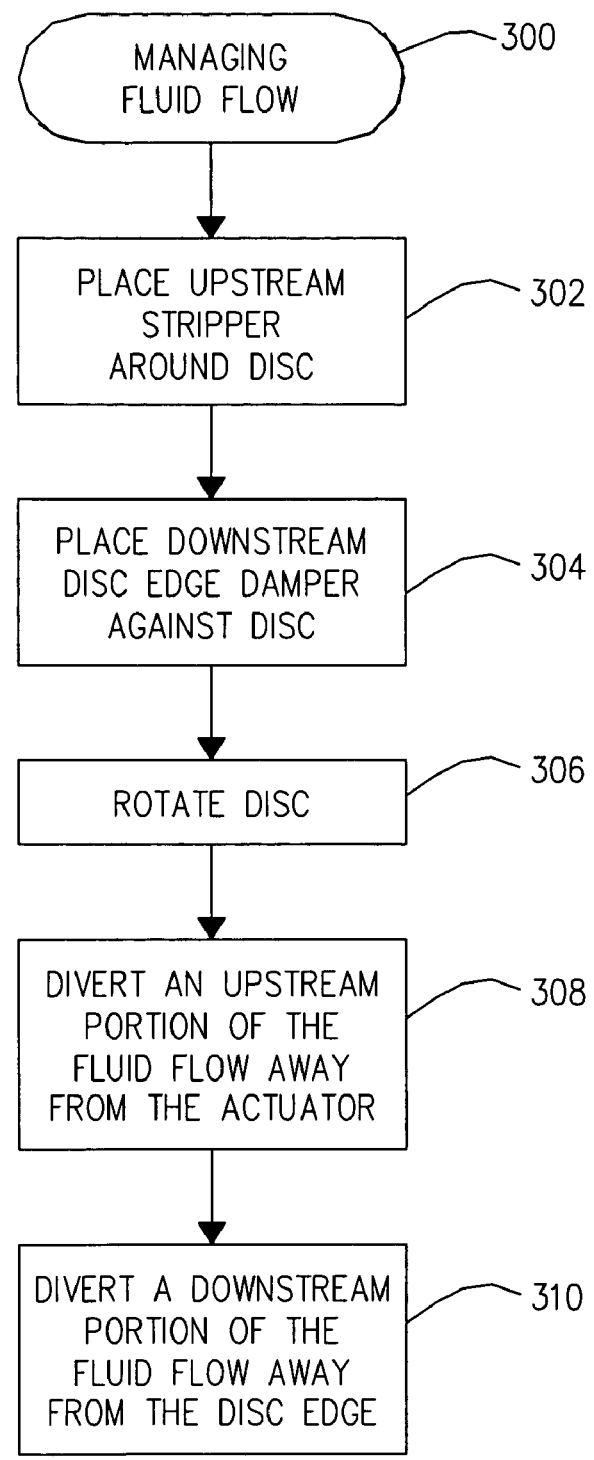
FIG. 11 is a block diagram of a method for managing fluid flow in accordance with embodiments of the present invention.

FIG. 11 illustrates a method 300 of MANAGING FLUID FLOW illustrating steps for practicing the embodiments of the present invention. The method 300 includes placing a stripper 122, 222 around the disc 102 at a location upstream of the actuator 106, 206 in block 302. In block 304 a damper 128, 228 is placed adjacent the disc 102 at a location downstream of the actuator 106, 206. In block 306 the disc 102 is rotated, creating the windage addressed by the embodiments of the present invention. In block 308 an upstream portion of the windage is diverted away from the actuator 106, 206 by the stripper 122, 222. In block 310 a downstream portion of the windage is diverted away from the disc 102 edge by the damper 128, 228.

With reference to the discussion above, the diverting an upstream portion step can comprise extending a pair of spatially disposed plates 134, 234 defining a gap therebetween that is receivingly engageable with the disc 102 in a close mating relationship between the plates 134, 234 and opposing sides of the disc 102. The diverting an upstream portion step can furthermore comprise articulating the plates 134 between a retracted position and an engaged position, such that in the retracted position the plates 134 are clearingly disengaged from the disc 102 permitting movement of the disc 102 along an axis of rotation. Preferably, the actuator 106, 206 operably engages a disc stack having a plurality of spaced-apart discs 102, wherein the diverting an upstream portion step comprises extending a plurality of plates 134, 234 matingly engaging the plurality of discs 102, with one of the plurality of plates 134, 234 disposed adjacent each side of each of the discs 102.

The diverting a downstream portion of the fluid flow can comprise extending a baffle 140, 240 in a close-mating edgewise relationship with the disc 102. Preferably, the diverting a downstream portion of the fluid flow comprises disposing a baffle central plane and a disc central plane as being substantially coplanar, and forming the baffle 140, 240 comprising a cross sectional thickness that is greater than one-half the disc 102 thickness. The diverting a downstream portion of the fluid flow step can furthermore comprise extending a shroud 142, 242 spanning the baffle 140, 240 for blocking return fluid from flowing across the baffle 140, 240 in a direction toward the disc 102.

Figure 12:
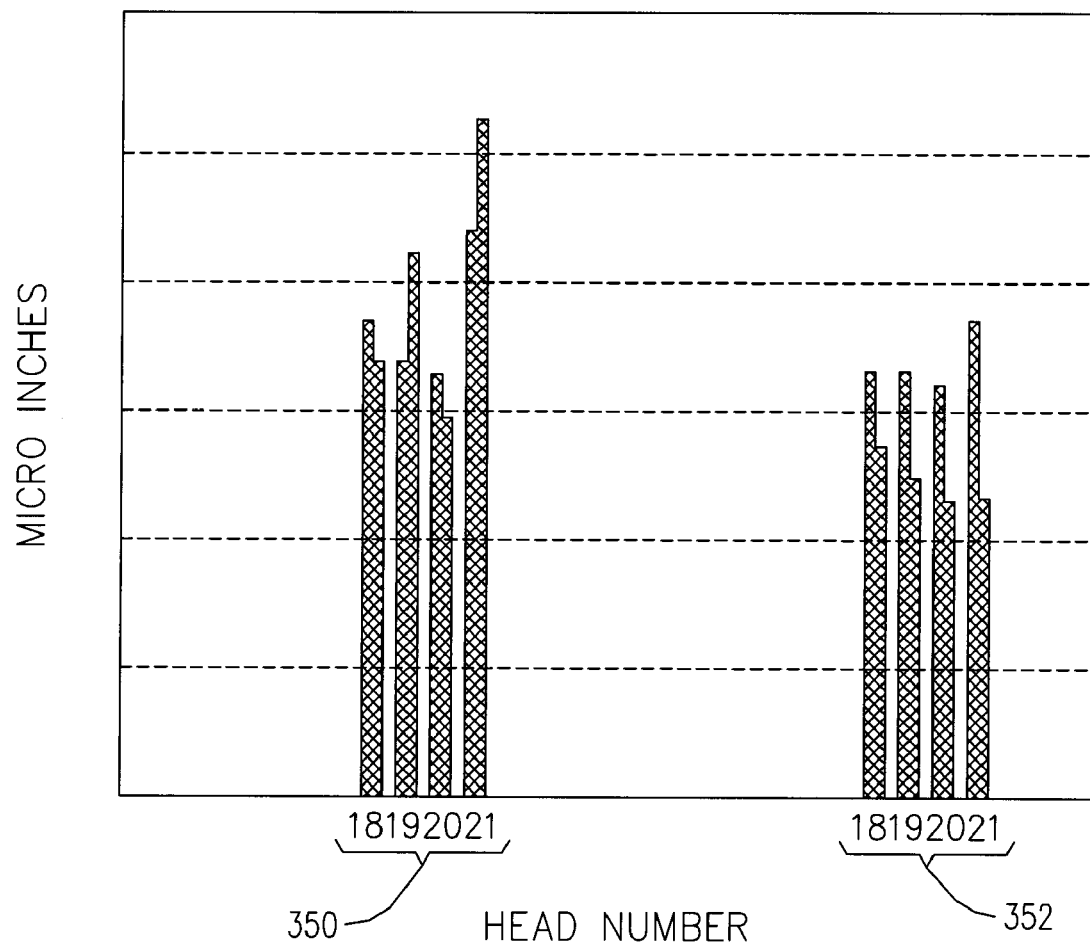
FIG. 12 is a bar chart indicating quantitative improvements associated with practicing embodiments of the present invention.

FIG. 12 illustrates results of testing the windage management arrangement of the present invention with and without the damper 128, 228. The grouping of data 350 indicates the amount of track squeeze present in a sample of heads and measured both at the disc 102 inner and outer diameters, for a windage arrangement comprising the stripper 122, 222 but not the damper 128, 228. The grouping of data 352 indicates the results of the same measurement for a windage arrangement comprising both the stripper 122, 222 and the damper 128, 228. For the latter arrangement, a total track squeeze improvement of over 30% was observed.

Summarizing generally, a windage management arrangement is provided for attenuating fluid flow disturbances on an actuator (such as 106, 206) and a moving disc (such as 102), comprising in combination a fluid flow stripper (such as 122, 222) upstream of the actuator and a disc edge damper (such as 128, 228) downstream of the actuator.

The fluid flow stripper can comprise a body and a pair of spatially disposed plates (such as 134, 234) extending from the body defining a gap therebetween that is receivingly engageable with the disc in a close mating relationship between the plates and opposing sides of the disc. In some embodiments the body is adapted for articulating movement between a retracted position and an engaged position, such that in the retracted position the plates are clearingly disengaged from the disc permitting movement of the disc in a direction along an axis of disc rotation.

Preferably, the actuator operably engages a disc stack having a plurality of spaced-apart discs, and the fluid flow stripper comprises a plurality of plates with each of the plurality of plates disposed adjacent to a side of one of the plurality of discs. The disc edge damper can comprise a baffle (such as 140, 240) disposed in a close-mating edgewise relationship with the disc. Preferably, a baffle central plane and a disc central plane are substantially coplanar, and the baffle defines a cross sectional thickness in edgewise relationship with a disc thickness, wherein the baffle thickness is greater than one-half the disc thickness. The disc edge damper can further comprise a shroud (such as 142, 242) spanning the baffle and blocking return fluid (such as 144, 244) from flowing across the baffle in a direction toward the disc.

In some embodiments a method (such 300) is provided for managing fluid flow created by a rotating disc that is operably disposed adjacent to an actuator. The method comprises diverting an upstream portion of the fluid flow (such as 308), with respect to the actuator, away from the actuator; and diverting a downstream portion of the fluid flow (such as 310), with respect to the actuator, away from a disc edge.

The diverting an upstream portion step can comprise extending a pair of spatially disposed plates defining a gap therebetween that is receivingly engageable with the disc in a close mating relationship between the plates and opposing sides of the disc. The diverting an upstream portion step can further comprise articulating the plates between a retracted position and an engaged position, such that in the retracted position the plates are clearingly disengaged from the disc permitting movement of the disc in a direction along an axis of disc rotation. Preferably, the diverting an upstream portion step comprises extending a plurality of plates matingly engaging a plurality of discs, with each of the plurality of plates disposed adjacent to a side of one of the plurality of discs.

The diverting a downstream portion of the fluid flow can comprise extending a baffle in a close-mating edgewise relationship with the disc. Preferably, the diverting a downstream portion of the fluid flow comprises disposing a baffle central plane and a disc central plane as being substantially coplanar, and forming the baffle comprising a cross sectional thickness that is greater than one-half a thickness of the disc. In some embodiments the diverting a downstream portion of the fluid flow step can comprise extending a shroud spanning the baffle for blocking fluid from flowing across the baffle in a direction toward the disc.

In some embodiments a data writing device is provided comprising a rotatable data storage disc, and an actuator in a writing relationship with the disc, the disc and actuator being shielded to minimize data transfer errors by steps for managing the fluid flow (such as 302-310) produced by the disc rotation. The steps for managing the fluid flow can be characterized by diverting an upstream portion of the fluid flow, with respect to the actuator, away from the actuator. The steps for managing the fluid flow can further be characterized by diverting a downstream portion of the fluid flow, with respect to the actuator, away from the disc edge. The steps for managing the fluid flow can further characterized by blocking a fluid from flowing across the baffle in a direction toward the disc.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the number and size of fluid flow strippers and baffles without departing from the scope and spirit of the present invention. In addition, although the preferred embodiments described herein are directed to a data writing device, it will be appreciated by those skilled in the art that the teachings of the present invention can be applied to other systems without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A windage management arrangement for attenuating fluid flow disturbances on an actuator and a moving disc, comprising:
   a fluid flow stripper upstream of the actuator which diverts an upstream portion of the fluid flow, with respect to the actuator, away from the actuator to impede a fluid flow from flowing across the actuator; and
   a disc edge damper downstream of the actuator which diverts a downstream portion of the fluid flow, with respect to the actuator, away from an edge of the disc to impede a return fluid flow from flowing toward a low pressure area proximate the center of the disc, the disc edge damper having a baffle extending therefrom in a close-mating edgewise relationship with the disc.

2. The arrangement of claim 1 wherein the fluid flow stripper comprises a body and a pair of spatially disposed plates extending from the body defining a gap therebetween that is receivingly positionable with the disc in a close mating relationship between the plates and opposing sides of the disc.

3. The arrangement of claim 2 wherein the disc is supported by a rotary motion device for spinning the disc around an axis of rotation, and wherein the body is adapted for articulating movement between a retracted position and an engaged position, such that in the retracted position the plates are clearingly disengaged from the disc permitting movement of the disc in a direction along the axis of rotation.

4. The arrangement of claim 1 wherein the actuator operably engages a disc stack having a plurality of spaced-apart discs, and wherein the fluid flow stripper comprises a plurality of plates with each of the plurality of plates disposed adjacent to a side of one of the plurality of discs.

5. The arrangement of claim 1 wherein a baffle central plane and a disc central plane are substantially coplanar.

6. The arrangement of claim 1 wherein the baffle defines a cross sectional thickness in edgewise relationship with a disc thickness, wherein the baffle thickness is greater than one-half the disc thickness.

7. The arrangement of claim 1 wherein the disc edge damper comprises a shroud spanning the baffle and blocking fluid from flowing across the baffle in a direction toward the disc.

* * * * *